US008804981B2

(12) United States Patent
Sorensen et al.

(10) Patent No.: US 8,804,981 B2
(45) Date of Patent: Aug. 12, 2014

(54) PROCESSING AUDIO SIGNALS

(75) Inventors: Karsten Vandborg Sorensen, Stockholm (SE); Jesus de Vicente Peña, Skarpnäck (SE)

(73) Assignee: Skype, Dublin (IE)

( * ) Notice: Subject to any disclaimer, the term of this patent is extended or adjusted under 35 U.S.C. 154(b) by 411 days.

(21) Appl. No.: 13/327,330

(22) Filed: Dec. 15, 2011

(65) Prior Publication Data

US 2012/0207327 A1 Aug. 16, 2012

(30) Foreign Application Priority Data

Feb. 16, 2011 (GB) .................................. 1102704.2

(51) Int. Cl.
*H04B 15/00* (2006.01)

(52) U.S. Cl.
USPC .......... 381/94.3; 381/94.1; 381/94.2; 381/91; 381/92; 704/225; 704/226

(58) Field of Classification Search
USPC ......... 381/94.3, 94.1, 94.2, 91, 92, 71.1, 122, 381/56; 704/225, 226
See application file for complete search history.

(56) References Cited

U.S. PATENT DOCUMENTS

| | | | | |
|---|---|---|---|---|
| 4,064,462 | A | 12/1977 | Goehler et al. | |
| 5,406,635 | A | 4/1995 | Jarvinen | |
| 6,339,758 | B1 * | 1/2002 | Kanazawa et al. | 704/226 |
| 2002/0071573 | A1 | 6/2002 | Finn | |
| 2005/0053299 | A1 | 3/2005 | Fuchs et al. | |
| 2005/0207567 | A1 | 9/2005 | Parry et al. | |
| 2005/0213657 | A1 | 9/2005 | Kodama et al. | |
| 2005/0226444 | A1 | 10/2005 | Coats | |
| 2008/0112481 | A1 | 5/2008 | Hsaing et al. | |
| 2010/0151787 | A1 | 6/2010 | Contreras et al. | |

FOREIGN PATENT DOCUMENTS

| | | |
|---|---|---|
| EP | 1439712 | 7/2004 |
| EP | 2184925 | 5/2010 |
| EP | 2230849 | 9/2010 |
| EP | 2337376 | 6/2011 |
| GB | 2293078 | 3/1996 |
| WO | WO-2006011104 | 2/2006 |
| WO | WO-2008122930 | 10/2008 |

OTHER PUBLICATIONS

"Search Report", GB Application No. 1102704.2, (Aug. 10, 2012), 4 pages.
"Search Report", GB Application No. 1110760.4, (Oct. 24, 2012), 4 pages.
"International Search Report and Written Opinion", Application No. PCT/EP2012/052718, (Jul. 2, 2012), 9 pages.

* cited by examiner

*Primary Examiner* — Paul Kim
(74) *Attorney, Agent, or Firm* — Sonia Cooper; Jim Ross; Micky Minahs

(57) ABSTRACT

According to an embodiment, a method of reducing noise in a signal received at a processing stage of an acoustic system includes, at the processing stage identifying at least one frequency which causes a system gain of the acoustic system to be above an average system gain of the acoustic system; providing a noise attenuation factor for reducing noise in the signal for the at least one frequency, the noise attenuation factor for the at least one frequency based on the system gain for that frequency; and applying the noise attenuation factor to a component of the signal at that frequency.

16 Claims, 5 Drawing Sheets

PROCESSING AUDIO SIGNALS

RELATED APPLICATION

This application claims priority under 35 U.S.C. §119 or 365 to Great Britain, Application No. GB 1102704.2, filed Feb. 16, 2011. The entire teachings of the above application are incorporated herein by reference.

TECHNICAL FIELD

The invention relates to processing audio signals, particularly but not exclusively in the case of a communication session between a near end device and a far end device.

BACKGROUND

Communication systems allow users to communicate with each other over a network. The network may be, for example, the Internet or public switched telephone network (PSTN). Audio signals can be transmitted between nodes of the network, to thereby allow users to transmit and receive audio data (such as speech data) to each other in a communication session over the communication system.

A user device may have audio input means such as a microphone that can be used to receive audio signals such as speech from a user. The user may enter into a communication session with another user, such as a private call (with just two users in the call) or a conference call (with more than two users in the call). The user's speech is received at the microphone, processed and is then transmitted over a network to the other users in the call.

As well as the audio signals from the user, the microphone may also receive other audio signals, such as background noise, which are unwanted and which may disturb the audio signals received from the user.

The user device may also have audio output means such as speakers for outputting audio signals to near end user that are received over the network from a far end user during a call. Such speakers can also be used to output audio signals from other applications which are executed at the user device, and which can be picked up by the microphone as unwanted audio signals which would disturb the speech signals from the near end user.

In addition, there might be other sources of unwanted noise in a room, such as cooling fans, air conditioning systems, music playing in the background and keyboard taps. All such noises can contribute to disturbance to the audio signal received at the microphone from the near end user for transmission in the call to a far end user.

In order to improve the quality of the signal, such as for use in the call, it is desirable to suppress unwanted audio signals (the background noise and the unwanted audio signals output from the user device) that are received at the audio input means of the user device. Various noise reduction techniques are known for this purpose including, for example, spectral subtraction (for example, as described in the paper "Suppression of acoustic noise in speech using spectral subtraction" by S. F. Bool IEEE Trans. Acoustics, Speech, Signal Processing (1979), 27(2):, pages 113-120.

Another difficulty that can arise in an acoustic system is "howling". Howling is an unwanted effect which arises from acoustic feedback in the system. It can be caused by a number of factors and arises when system gain is high.

SUMMARY

It is an aim of the present invention to reduce howling without unnecessarily interfering with optimization of the perceptual quality of noise reduction techniques used in audio signal processing.

According to one aspect of the present invention there is provided a method of reducing noise in a signal received at a processing stage of an acoustic system, the method comprising, at the processing stage:

identifying at least one frequency which causes a system gain of the acoustic system to be above an average system gain of the acoustic system;

providing a noise attenuation factor for reducing noise in the signal for the at least one frequency, the noise attenuation factor for the at least one frequency based on the system gain for that frequency; and applying the noise attenuation factor to a component of the signal at that frequency.

In the described embodiment, the step of identifying at least one frequency which causes a system gain of the acoustic system to be above an average system gain of the acoustic system is carried out by estimating a respective system gain of the acoustic system for each of a plurality of frequencies in the received signal. This allows one or more frequencies which cause the higher system gain to be identified. In this case, it is not necessary to actually calculate an average system gain—it will be apparent that the highest system gains are above the average.

Alternatively, the frequency can be identified based on known characteristics of a device including the processing stage. For example, it might be apparent that a particular component of the device (for example, a loudspeaker) has a problematic resonant frequency which would cause howling.

Alternatively, rather than estimating a system gain, the system gain can actually be measured. For example, it could be estimated or measured based on the echo path. References to "system gain" herein encompass an estimated system gain and/or a measured system gain.

Although it is possible to obtain advantages from the invention by attenuating only one frequency which is likely to predispose the acoustic system to howling, it is particularly advantageous if a respective system gain of the acoustic system is calculated for each of a plurality of frequencies in the received signal, and a noise attenuation factor is provided for each of the plurality of frequencies. In that case, each noise attenuation factor can be applied to a respective component of the signal at that frequency. In this way, the system gain spectrum of the acoustic system can be taken into account.

In the described embodiment, each of the plurality of frequencies lies in a frequency band, and the system gain and noise attenuation factor for each frequency is applied over the whole of the frequency band containing that frequency. In a practical embodiment frequencies in the range 0 to 8 KHz are handled over 64 or 32 bands of equal width.

Embodiments of the invention are particularly useful where the signal received at the processing stage is speech from a user. In that case, the speech is processed in time intervals, for example, frames, and the respective system gain and noise attenuation factors are provided for each of the plurality of frequencies in each frame.

The system gain can be estimated by multiplying all gains that are applied in the system, including the gain in the echo path which can be either an estimated or predetermined.

In a described embodiment, the noise attenuation factor which is provided for each frequency is selected as the maximum of a first and second noise attenuation factor. In that case, the first noise attenuation factor can be calculated based on a signal-plus-noise to noise ratio of the signal, and the second noise attenuation factor can be a variable minimum gain factor based on the system gain. In that embodiment of the invention, the effects of the invention are only felt at signal components with lower signal-plus-noise to noise ratios where the variable minimum gain factors are provided as the noise attenuation factors for the different frequencies. For components with higher signal-plus-noise to noise ratios, the noise attenuation factor is calculated and provided in a way which causes the noise reduction to gently reduce as the signal-plus-noise to noise ratio increases, thus leaving behind near end speech without any significant reduction or equalization.

The variable minimum gain factor can be based on the system gain according to a function which selects a minimum of a ratio of maximum system gain to average system gain and at least one predetermined value. The function can be multiplied by a constant minimum gain factor.

The noise reduction method discussed herein can be applied on a signal for playout that has been received from the far end in a communication network, or be applied partly on the far end signal and partly on a signal received at the near end (for example, by an audio input means at a user device).

The invention also provides in another aspect, an acoustic system comprising:

an audio input arranged to receive a signal;

a signal processing stage connected to receive the signal from the audio input; the signal processing stage comprising:

means for identifying at least one frequency which causes a system gain of the acoustic system to be above an average system gain of the acoustic system;

means for providing a noise attenuation factor for reducing noise in the signal for the at least one frequency, the noise attenuation factor for the at least one frequency based on the system gain for that frequency; and means for applying the noise attenuation factor to a component of the signal at that frequency.

A further aspect provides a signal processing stage for processing an audio signal, the signal processing stage comprising:

means for identifying at least one frequency which causes a system gain of the acoustic system to be above an average system gain of the acoustic system;

means for providing a noise attenuation factor for reducing noise in the signal for the at least one frequency, the noise attenuation factor for the at least one frequency based on the system gain for that frequency; and means for applying the noise attenuation factor to a component of the signal at that frequency.

Another aspect provides a user device comprising an audio input for receiving an audio signal from a user;

a signal processing stage for processing the signal; and means for transmitting the processed signal wirelessly from the user device to a remote device, the signal processing stage as defined above.

According to another aspect of the present invention, there is provided a method of reducing noise in a signal received at a processing stage of an acoustic system, the method comprising, at the processing stage:

estimating or measuring a respective system gain of the acoustic system for at least one frequency in the received signal;

providing a noise attenuation factor for reducing noise in the signal at that frequency, the noise attenuation factor being based on the system gain measured or estimated for that frequency; and applying the noise attenuation factor to a component of the signal at that frequency.

Preferably, the system gain is estimated or measured for each of a plurality of frequencies in the received signal, and a respective noise attenuation factor is provided and applied for respective components of the signal at each frequency, the noise attenuation factor for each frequency being based on the system gain estimated or measured for that frequency.

In the following embodiments of the invention, there is achieved the advantage of system gain reduction arising from equalization by noise attenuation, while adapting to the actual conditions. This means that any acoustic effect on the system gain spectrum from the room is taken into account.

For a better understanding of the present invention and to show how the same may be carried into effect, reference will now be made by way of example to the accompanying drawings.

DETAILED DESCRIPTION

In the following described embodiments of the invention, a technique is described wherein a continuously updated estimate of the system gain spectrum is applied to adapt a noise reduction method to apply more noise suppression in parts of the spectrum where the system gain is high. By applying greater noise suppression in parts of the spectrum where the system gain is high, the system gain over those parts is reduced and thus robustness to howling is increased. Before describing the particular embodiments of the present invention, a context in which the invention can usefully be applied will now be described with reference to FIG. 1, which illustrates a communication system 100.

A first user of the communication system (User A 102) operates a user device 104. The user device 104 may be, for example a mobile phone, a television, a personal digital assistant ("PDA"), a personal computer ("PC") (including, for example, Windows™, Mac OS™ and Linux™ PCs), a gaming device or other embedded device able to communicate over the communication system 100.

The user device 104 comprises a central processing unit (CPU) 108 which may be configured to execute an application such as a communication client for communicating over the communication system 100. The application allows the user device 104 to engage in calls and other communication sessions (e.g. instant messaging communication sessions) over the communication system 100. The user device 104 can communicate over the communication system 100 via a network 106, which may be, for example, the Internet or the Public Switched Telephone Network (PSTN). The user device 104 can transmit data to, and receive data from, the network 106 over the link 110.

Figure 1:
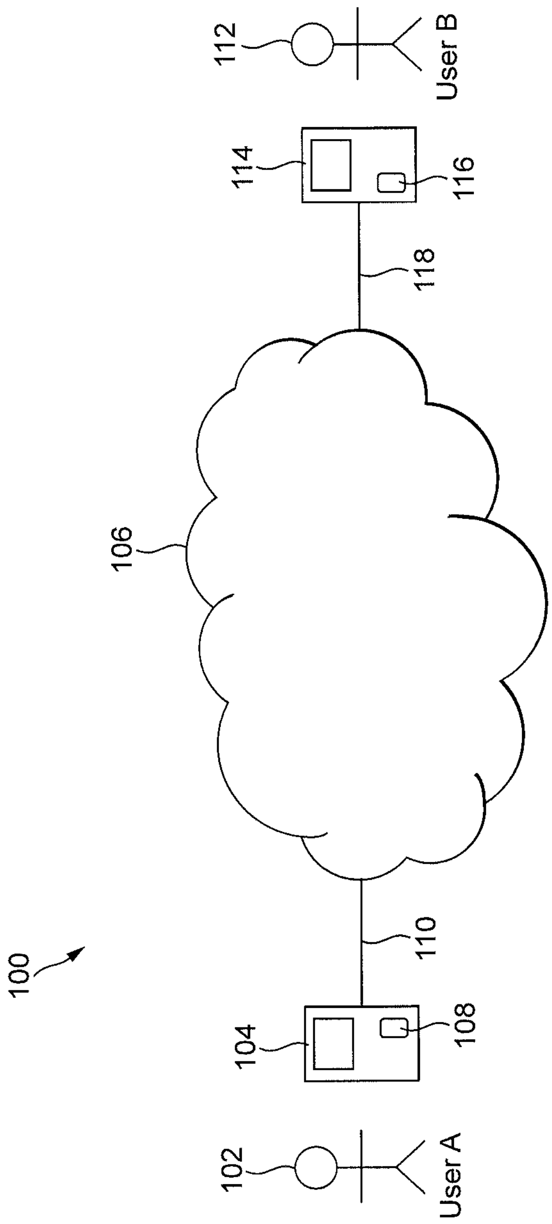
FIG. 1 is a schematic diagram of a communication system.

FIG. 1 also shows a remote node with which the user device 104 can communicate over the communication system 100. In the example shown in FIG. 1, the remote node is a second user device 114 which is usable by a second user 112 and which comprises a CPU 116 which can execute an application (e.g. a communication client) in order to communicate over the communication network 106 in the same way that the user device 104 communicates over the communications network 106 in the communication system 100. The user device 114 may be, for example a mobile phone, a television, a personal digital assistant ("PDA"), a personal computer ("PC") (including, for example, Windows™, Mac OS™ and Linux™ PCs), a gaming device or other embedded device able to communicate over the communication system 100. The user device 114 can transmit data to, and receive data from, the network 106 over the link 118. Therefore User A 102 and User B 112 can communicate with each other over the communications network 106.

Figure 2:
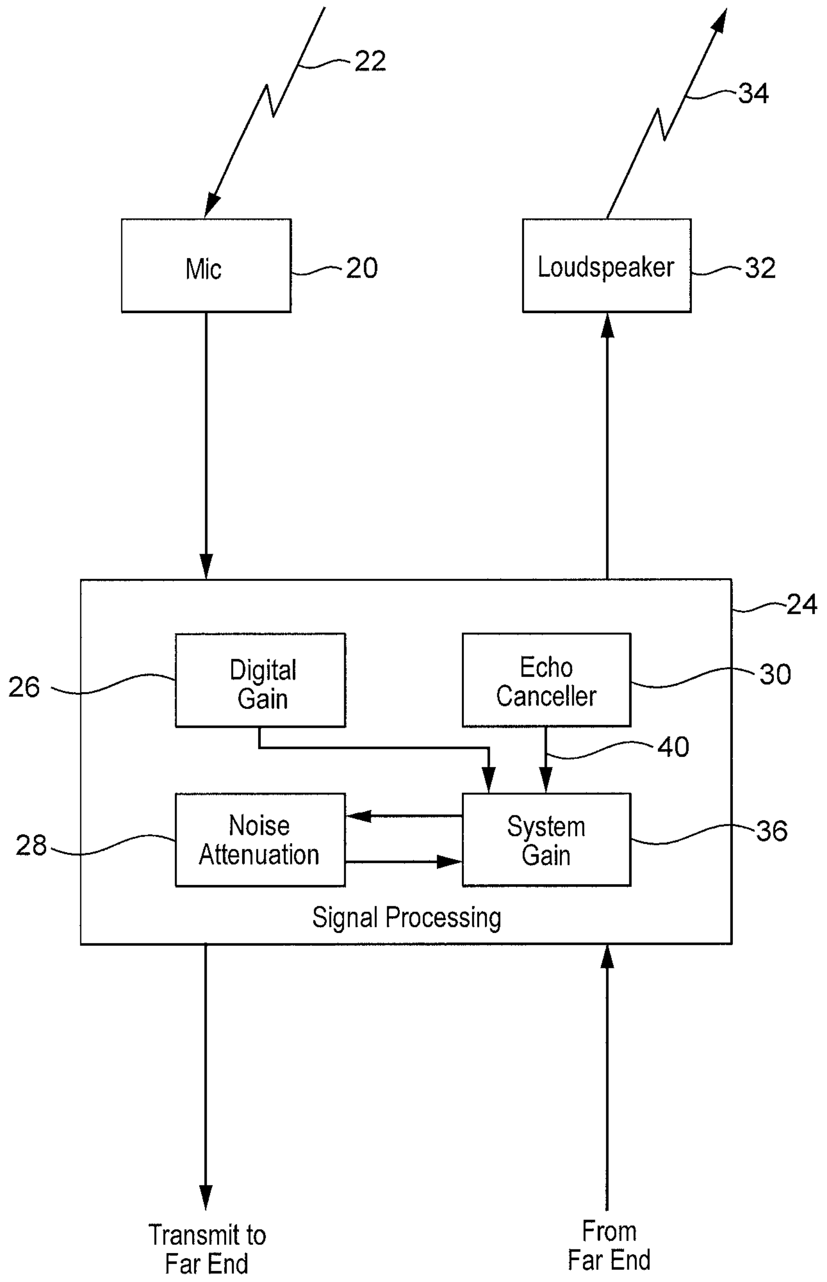
FIG. 2 is a block diagram of a user device.

FIG. 2 illustrates the user device 104 at the near end speaker in more detail. In particular, FIG. 2 illustrates a microphone 20 receiving a speech signal from user 22. The microphone can be a single microphone or a microphone array comprising a plurality of microphones and optionally including a beamformer. As is known, a beamformer receives audio signals from the microphones in a microphone array and processes them in an attempt to improve the signal in a wanted direction in comparison to signals perceived to be coming from unwanted directions. This involves applying a higher gain in a desired direction.

Signals from the microphone (whether with or without a beamformer) are applied to a signal processing stage 24. The signal processing stage 24 includes a plurality of signal processing blocks, each of which can be implemented in hardware or software or a combination thereof as is deemed appropriate. The blocks can include, for example, a digital gain block 26, a noise attenuation block 28 and an echo canceller block 30.

A loud speaker 32 is provided to provide audio signals 34 intended for the user 102. Such signals can come from a far end speaker to be output to a user, or can alternatively come from the user device itself as discussed earlier. In a situation where signals output by the loudspeaker 34 come from a far end user such as user 112, they can be processed before being emitted by the loudspeaker by signal processing circuitry and for the sake of convenience the loudspeaker is shown connected to signal processing circuitry 24 in FIG. 2. Optionally, they can be processed using the noise attenuation technique described below.

After signal processing, the signals input by the user 102 and picked up by the microphone 20 are transmitted for communicating with the far end user 112.

The signal processing circuitry 24 further includes a system gain estimation block 36. As discussed in more detail later, and as distinct from known system gain estimation blocks, block 36 estimates system gain taking into account the shape of the system gain spectrum. That is, the system gain varies with frequency. Estimates of system gain for different frequencies are supplied to the noise attenuation block 28.

Howling is a symptom of having feedback with a system gain higher than 1 somewhere in the frequency spectrum. By reducing the system gain at this frequency, the howling will stop. Very often, a resonating frequency in the loudspeaker, microphone or echo path will be much larger than average and will be what is limiting the robustness to howling. The system gain is estimated by taking into consideration the blocks involved in system processing (including for example the digital gain block, echo canceller, and background noise attenuation block), and in particular, uses information from the echo path estimated in the echo canceller attenuation block which provides information about the room in which the device is located. The shape of the spectrum is usually dominated by the estimated echo path, as the transfer function of the echo path includes the transfer function of the loudspeaker where resonating frequencies often occur. In FIG. 2, the estimated echo path is denoted by arrow 40.

By estimating system gain spectrum contribution from the near end side, it is possible to obtain knowledge about which parts of the spectrum are more likely to dominate in generation of a howling effect. When two similar devices 104, 114 are being used in a call, this half-side information can be very accurate in terms of knowing which part of the spectrum will be dominating as the resonating frequencies will coincide on the two devices.

The estimate of system gain spectrum supplied to the noise attenuation block 28 is used to modify operation of the noise attenuation method, as discussed below.

Signal processing is performed on a per frame basis. Frames can, for example, be between 5 and 20 milliseconds in length and for the purpose of noise suppression be divided into spectral bins, for example, between 64 and 256 bins per frame. Each bin contains information about a signal component at a certain frequency, or in a certain frequency band. For dealing with wideband signals, the frequency range from 0 to 8 kHz is processed, divided into 64 or 32 frequency bands of equal width. It is not necessary that the bands are of equal width—they could for example be adjusted to better reflect the critical bands of the human hearing such as done by the Bark scale.

Ideally, for speech, each frame is processed in real time and each frame receives an updated estimate of system gain for each frequency bin from system gain block 36. Thus each bin is processed using an estimate of system gain specific to that frame and the frequency of that bin.

Figure 3:
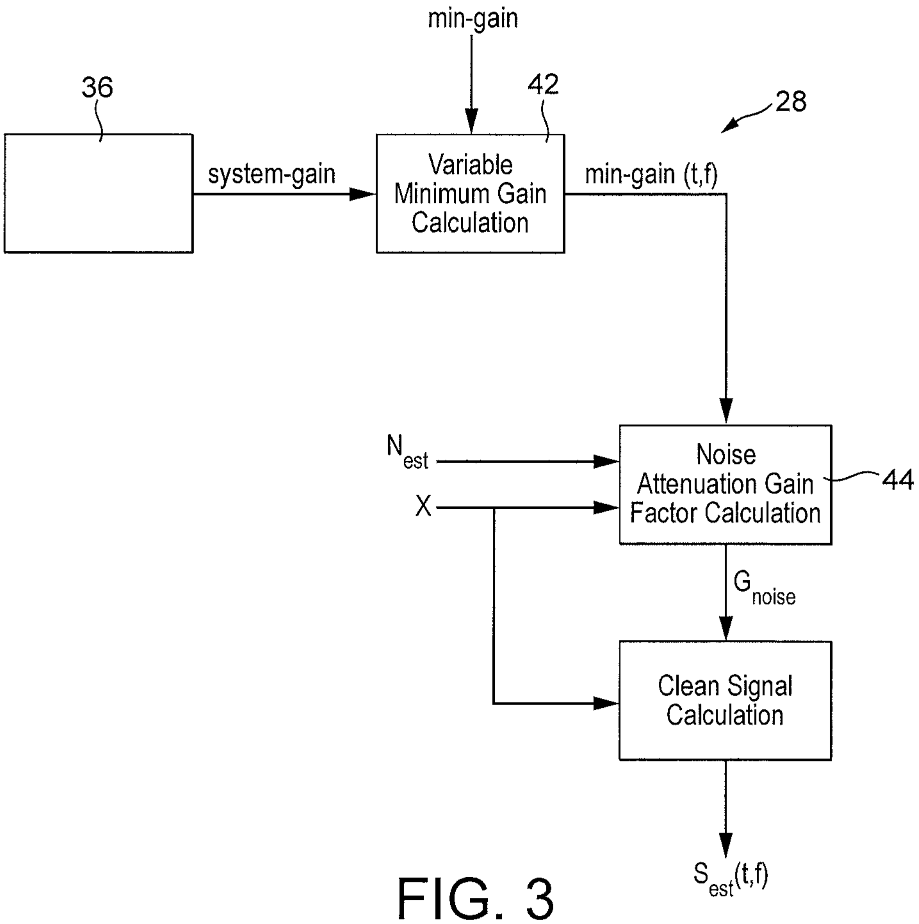
FIG. 3 is a schematic function diagram of a noise attenuation technique.

FIG. 3 illustrates according to one example, how a noise attenuation gain factor can be calculated to take into account frequency based estimates of system gain.

It will be appreciated that FIG. 3 illustrates various functional blocks which can be implemented in software as appropriate. A variable minimal gain calculation block 42 generates a variable minimum gain value min_gain(t,f)) at time t and frequency f. The variable minimum gain value is generated based on the system gain system_gain and a fixed minimum gain value min_gain as in equation 1:

$$\text{min\_gain}(t,f)=\text{min\_gain}*f(\text{system\_gain}(t,f)) \quad \text{(Eq. 1)}$$

In the variable minimum calculation block the function, f(·), of the system gain according to one example is as given in equation 2:

$$f(\text{system\_gain}(t,f))=(\min(\max(\text{system\_gain}(t,f)/\text{avg\_system\_gain}(t), 1.25), 5.25)-0.25)^{-1} \quad \text{(Eq. 2)}$$

This function has the effect of lowering the variable minimum gain value min_gain(t,f) when the system gain is high in the current frequency band. As will be clear from the following, this has the effect of more noise attenuation in the bands with the highest local system gain.

The variable minimum gain value is supplied to a noise attenuation gain factor calculation block 44. This block calculates a noise attenuation gain factor $G_{noise}(t,f)$ at time t and frequency f. The gain factor $G_{noise}$ takes into account a noise level estimate $N_{est}$ and the signal received from the microphone X, representing the signal plus noise incoming from the microphone.

A first noise attenuation gain factor is calculated according to equation 3:

$$G_{noise}(t,f)=((X(t,f)^2-N_{est}(t,f)^2)/X(t,f)^2)=(1-(X(t,f)^2/N_{est}(t,f)^2)^{-1}) \quad \text{(Eq. 3)}$$

In classical noise reduction, such as for example, power spectral subtraction as in the example above, the coefficient $S_{est}$(t,f) at time t and frequency f of the estimated clean signal is calculated as the square root of the noise attenuation gain multiplied with the squared coefficients of the signal plus noise—that is, as in equation 4 where equation 3 provides the noise attenuation gain factor $G_{noise}$:

$$S_{est}(t,f)=\text{sqrt}(G_{noise}(t,f)*X(t,f)^2) \quad \text{(Eq. 4)}$$

Thus, $S_{est}$(t,f) represents the coefficient of the best estimate of a clean signal for transmission to the far end after signal processing.

The noise attenuation gain factor $G_{noise}$ can be lower limited for improving perceptual quality as in equation 5:

$$G_{noise}(t,f)=\max(1-(X(t,f)^2/N_{est}(t,f)^2)^{-1}, \text{min\_gain}(t,f)). \quad \text{(Eq. 5)}$$

That is, the noise attenuation gain factor calculated according to equation 3, is only applied to the extent that it is above a minimum gain value min_gain (f,t).

In existing noise reduction techniques, the minimum gain value is fixed at min gain, and could take, for example, a constant value of approximately 0.2. In contrast, embodiments of the present invention vary the minimum gain value as has been described to provide an individual minimum gain for each frequency band, such that the minimum gain value can be lowered when the local system gain for that band is high. The minimum gain value is a function of the system gain spectrum which is adapted over time, such that it tracks any changes that may occur in the system gain spectrum.

By incorporating spectral system gain equalization in the noise reduction method, it is provided that in a state of no speech activity, the left-behind noise is equalized by applying more noise reduction in frequency bands where the system gain is high and thereby reducing the system gain in those bands. This is shown in equation 5, which indicates that the noise attenuation gain factor $G_{noise}$ is the maximum of the variable minimum gain value and the value calculated using the signal-plus-noise to noise ratio. This has the effect of allowing a higher noise reduction (lower $G_{noise}$) when the signal-plus-noise to noise ratio is low. When the signal-plus-noise to noise ratio is high, however, for example in the case of near end activity, the effect of the variable minimum gain factor is overtaken by the conventional calculation of the noise attenuation factor $G_{noise}$, which reduces the noise attenuation as the signal to noise ratio increases. In such a case, near end speech is thus left without any significant reduction or equalization.

Figure 4:
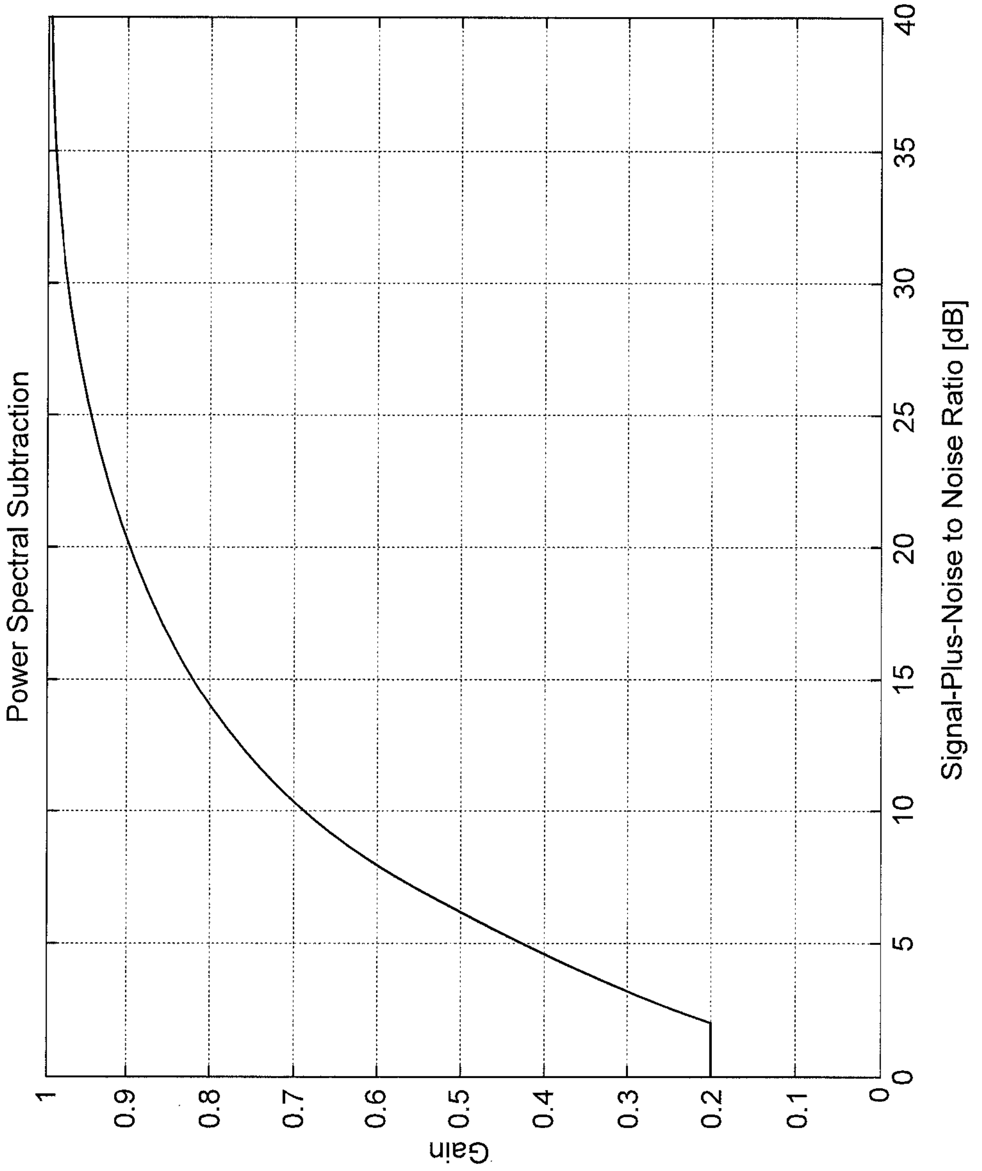
FIG. 4 is a graph of gain vs. signal plus noise to noise ratio.

FIG. 4 illustrates the case where the minimum gain is a constant value of approximately 0.2 and shows the effect on the gain factor $G_{noise}$ as the signal plus noise to noise ratio increases. As $G_{noise}$ approaches 1, the noise attenuation decreases until it is virtually zero as the signal plus noise to noise ratio increases.

Figure 5:
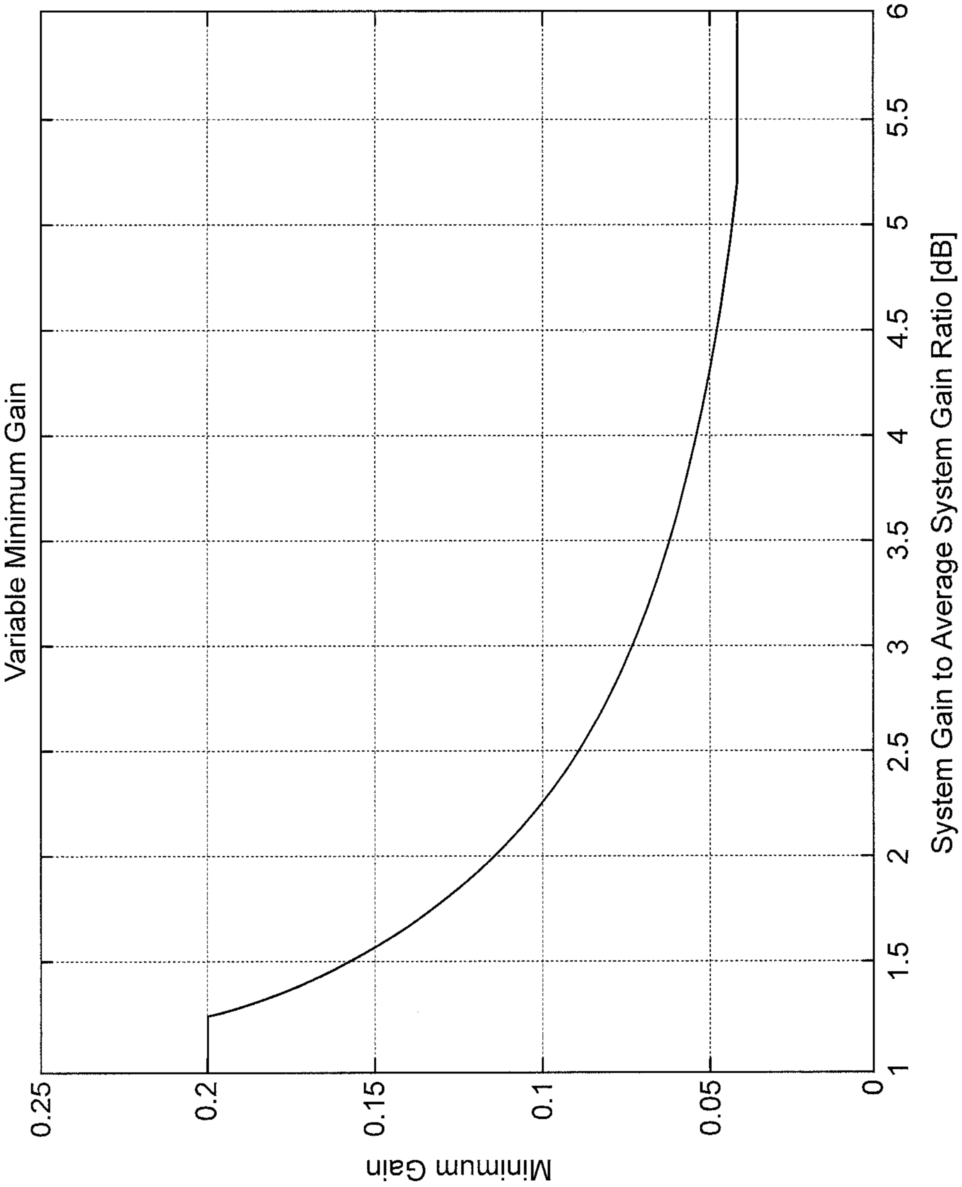
FIG. 5 is a graph of minimum gain vs. system gain to average system gain ratio.

FIG. 5 is graph showing how the minimum gain varies as a function of the system gain according to equation 2.

While this invention has been particularly shown and described with references to example embodiments thereof, it will be understood by those skilled in the art that various changes in form and details may be made therein without departing from the scope of the invention encompassed by the appended claims.

What is claimed is:

1. A method of reducing noise in a signal received at a processing stage of an acoustic system, the method comprising, at the processing stage:

identifying at least one frequency at which a system gain of the acoustic system is above an average system gain of the acoustic system;

providing a noise attenuation factor for reducing noise in the signal for the at least one frequency, the noise attenuation factor for the at least one frequency based on the system gain for that frequency; and applying the noise attenuation factor to a component of the signal at that frequency, wherein the noise attenuation factor is lower limited by a variable minimum gain value, the variable minimum gain value being generated based on the system gain at that frequency.

2. A method according to claim 1, wherein the at least one frequency is identified by at least one of:

estimating a respective system gain of the acoustic system for each of a plurality of frequencies in the received signal; and measuring a system gain; and wherein each of the plurality of frequencies lies in a frequency band, a respective noise attenuation factor is provided for each of the plurality of frequencies, and each noise attenuation factor is applied over the frequency band containing the frequency; and wherein the system gain is estimated or measured based on an echo path in the acoustic system.

3. A method according to claim 1, wherein the step of identifying at least one frequency is based on known characteristics of a device which includes the processing stage.

4. A method according to claim 1, wherein the respective noise attenuation factor is provided by calculating a first noise attenuation factor based on a signal (or signal-plus-noise) to noise ratio of the received signal at the at least one frequency, calculating a second noise attenuation factor based on the system gain for that frequency, and;

providing the one of the first and second noise attenuation factors with the higher value.

5. A method according to claim 1, wherein the noise attenuation factor is based on the system gain according to a function of the system gain which comprises selecting a minimum of:

a maximum of the ration of system gain to average system gain and a predetermined value; and a further predetermined value.

6. A method according to claim 1, wherein the noise attenuation factor is based on the system gain by a multiple of said function and a constant minimum gain value.

7. A method according to claim 1, wherein the noise attenuation factor is suitable for power spectral subtraction.

8. An acoustic system comprising:

an audio input arranged to receive a signal;

a signal processing stage connected to receive the signal from the audio input;

the signal processing stage configured to identify at least one frequency which causes a system gain of the acoustic system to be above an average system gain of the acoustic system;

the signal processing stage configured to provide a noise attenuation factor for reducing noise in the signal for the at least one frequency, the noise attenuation factor for the at least one frequency based on the system gain for that frequency; and the signal processing stage configured to apply the noise attenuation factor to a component of the signal at that frequency.

9. A user device comprising:

an audio input for receiving an audio signal from a user;

a signal processing stage for processing the signal;

a transmitter configured to transmit the processed signal wirelessly from the user device to a remote device; and the signal processing stage configured to identify at least one frequency which causes a system gain of the acoustic system to be above an average system gain of the acoustic system, the signal processing stage being configured to provide a noise attenuation factor for reducing noise in the signal for the at least one frequency, the noise attenuation factor for the at least one frequency based on the system gain for that frequency, and the signal processing stage being configured to apply the noise attenuation factor to a component of the signal at that frequency.

10. A signal processing stage for processing an audio signal, the signal processing stage comprising:

means for identifying at least one frequency which causes a system gain of an acoustic system to be above an average system gain of the acoustic system;

means for providing a noise attenuation factor for reducing noise in the signal for the at least one frequency, the noise attenuation factor for the at least one frequency based on the system gain for that frequency; and means for applying the noise attenuation factor to a component of the signal at that frequency, wherein the noise attenuation factor is lower limited by a variable minimum gain value, the variable minimum gain value being generated based on the system gain at that frequency.

11. A signal processing stage according to claim 10, wherein the noise attenuation factor is based on the system gain according to a function of the system gain which comprises selecting a minimum of:

a maximum of the ration of system gain to average system gain and a predetermined value; and a further predetermined value.

12. A signal processing stage according to claim 10, wherein the noise attenuation factor is based on the system gain by a multiple of said function and a constant minimum gain value.

13. A signal processing stage according to claim 10, wherein the at least one frequency is identified by at least one of:

estimating a respective system gain of the acoustic system for each of a plurality of frequencies in the received signal; and measuring a system gain; and wherein each of the plurality of frequencies lies in a frequency band, a respective noise attenuation factor is provided for each of the plurality of frequencies, and each noise attenuation factor is applied over the frequency band containing the frequency; and wherein the system gain is estimated or measured based on an echo path in the acoustic system.

14. A signal processing stage according to claim 10, wherein the step of identifying at least one frequency is based on known characteristics of a device which includes the processing stage.

15. A signal processing stage according to claim 10, wherein the respective noise attenuation factor is provided by calculating a first noise attenuation factor based on a signal (or signal-plus-noise) to noise ratio of the received signal at the at least one frequency, calculating a second noise attenuation factor based on the system gain for that frequency, and;

providing the one of the first and second noise attenuation factors with the higher value.

16. A signal processing stage according to claim 10, wherein the noise attenuation factor is suitable for power spectral subtraction.

* * * * *